July 18, 1961 P. LÜSCHER 2,992,873
CONTAINER FOR THE WARMING-UP OF PILED OBJECTS, IN
PARTICULAR DISHES AND PLATES
Filed Nov. 26, 1957

United States Patent Office 2,992,873
Patented July 18, 1961

2,992,873
CONTAINER FOR THE WARMING-UP OF PILED OBJECTS, IN PARTICULAR DISHES AND PLATES
Paul Lüscher, Tauffelen, Berne, Switzerland
Filed Nov. 26, 1957, Ser. No. 699,056
Claims priority, application Switzerland May 14, 1957
2 Claims. (Cl. 312—276)

The present invention relates to a container for warming-up piled objects, in particular dishes and plates, in which container at least one lateral closable opening in the form of a slot is provided and opens, at its upper end, into an upper opening in the container which is also closable by a lid or the like.

The construction makes it possible to lay in and to take out the dishes, plates or the like that are to be warmed up, since the dishes can be taken hold of through the side opening or openings and introduced or removed through the top opening.

Figure 1:
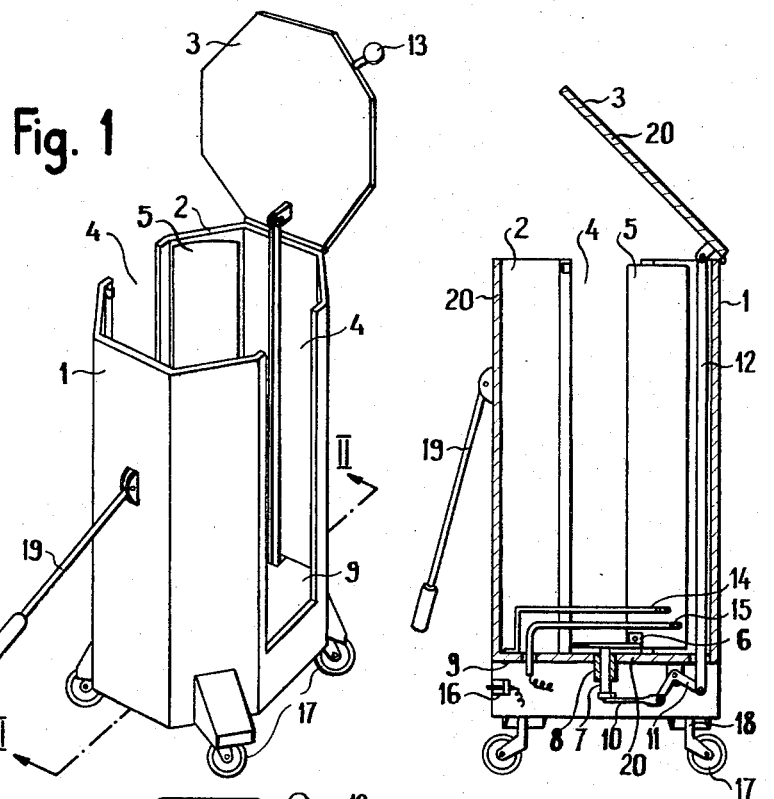
Figure 2:
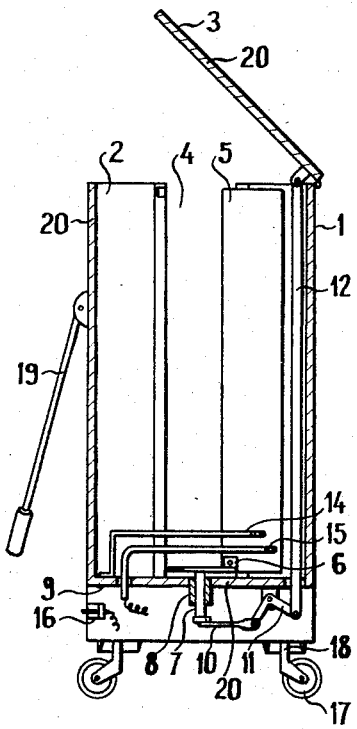

One embodiment of the invention is further described below with reference to the accompanying drawing in which:

FIG. 1 is a perspective view of a container in the open state,

FIG. 2 a section through this container on the line II—II in FIG. 1 and

Figure 3:
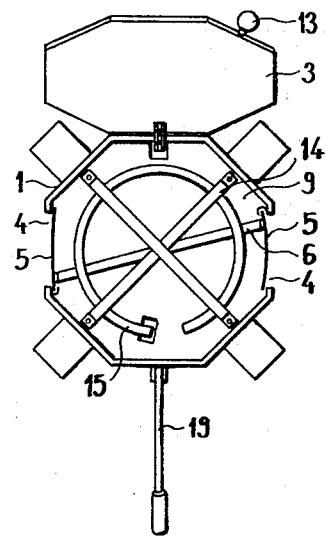

FIG. 3 a plan view of the container.

The container 1, which is essentially prismatic and octagonal in cross-section, has an upper opening 2 which can be closed by a hinged lid 3. Further, the container has two lateral, slot-shaped openings 4, each of which can be closed by a slide 5. The lateral openings 4, at their upper ends, open into or communicate with the upper opening 2. The slides 5 are rotatable about the vertical axis of the container. At their lower ends the slides 5 are fixed to an arm 6, which, at its center, is mounted on a pivot pin 7. The pin 7 is rotatably carried in the bush 8 fixed on the bottom 9 of the container 1. A lever arm, which is not visible in FIG. 2, is fixed to the lower end of pin 7 and, a link 10 is joined to the outer end of this lever arm. The link 10 is connected to one arm of a bellcrank lever 11 carried pivotally on the bottom 9, while the other arm of this bellcrank lever is connected to a link 12 which, at its upper end, is joined to the lid 3. The slides 5 and the lid 3 are thus mechanically coupled to each other in such a way that, when the hinged lid 3 is raised, the side openings 4 are uncovered. Naturally the slides 5 close the openings 4 again, as soon as the lid is closed. For opening and closing the container, a handle 13 is arranged on the hinged lid.

In FIG. 3 the slides 5 are shown in the closed state merely by way of illustration.

On the bottom 9 a cross-shaped support 14 is arranged, on which for instance dinner plates can be piled in order to be warmed. Between this support 14 and bottom 9, a circularly bent heating element 15 is arranged, one end of such heating element projecting downwards through a bottom 9 for receiving electric current, which is introduced at the socket 16. Further, a switch and a thermostat are also fitted in the electric circuit of the container, so that the heating element can be switched on and off as required, or the temperature can be regulated in the container by the thermostat.

The container is mounted on four small wheels 17, which are capable of swivelling in vertically directed guides 18. By means of a handle 19 which is mounted on the container for pivoting in a vertical plane, a warmed-up pile of plates can easily be wheeled to a desired place, after the electric supply cable has been withdrawn from the socket 16. In this manner, for instance in a restaurant service, much time can be saved, since the previously heated plates can be wheeled from table to table, where they can be lifted out of the container in a convenient manner.

The container walls and the lid 3 are provided with an insulating lagging 20, in order to diminish heat losses.

Instead of the illustrated octagonal cross-section, the container may have a circular or rectangular cross-section.

In the case of containers of small capacity, the container can be of reduced height and the caster wheels can be omitted.

What is claimed is:

1. In a device for warming stacks of dishes and the like; the combination of a vertically elongated container having an opening at the top thereof and a pair of vertically elongated openings in the opposed sides of the container communicating, at their upper ends, with said opening in the top of the container so that dishes to be warmed can be grasped through said vertically elongated opening of the container while inserting and removing the dishes through said opening at the top of the container, a lid hingedly mounted on the top of said container to swing about a horizontal axis between a closed position, where said lid extends horizontally across said opening at the top, and a raised open position, movable closures for said vertically elongated openings in the sides of the container, an arm extending across the bottom of said container and being mounted, at its center for rotation about the central vertical axis of said container, said movable closures being fixed to the opposite ends of said arm to turn with the latter between open and closed positions in relation to said vertically elongated openings, and mechanical coupling means between said lid and said closures to effect the simultaneous movement of said lid and closures between the respective open and closed positions.

2. In a device for warming stacks of dishes and the like; the combination as in claim 1, wherein said mechanical coupling means includes a first link depending from said lid and having its upper end pivotally connected to the lid at a location spaced from the horizontal hinge axis of the latter, a bell-crank pivotally mounted below said bottom of the container for angular movement about a horizontal axis and having one end pivotally connected to the lower end of said link, an axle depending from said center of the arm, a lever extending radially from said axle below said bottom of the container, and a second link pivotally connected to said lever and to the other end of said bell-crank.

References Cited in the file of this patent
UNITED STATES PATENTS

| 1,342,851 | Landis | June 8, 1920 |
| 2,314,248 | Rutledge | Mar. 16, 1943 |
| 2,722,807 | Downing | Nov. 8, 1955 |
| 2,806,123 | Steinbock | Sept. 10, 1957 |
| 2,812,415 | Markowitz | Nov. 5, 1957 |

FOREIGN PATENTS

| 1,841 | Great Britain | Aug. 6, 1853 |
| 372,103 | Italy | Jan. 16, 1939 |